United States Patent
Hodsdon

(10) Patent No.: US 7,270,234 B2
(45) Date of Patent: Sep. 18, 2007

(54) PRINTABLE SLEEVE ENVELOPE AND METHOD OF FORMING SAME

(75) Inventor: Jerry G. Hodsdon, Forestdale, MA (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 10/471,070

(22) PCT Filed: Mar. 6, 2002

(86) PCT No.: PCT/US02/06486

§ 371 (c)(1),
(2), (4) Date: Mar. 24, 2004

(87) PCT Pub. No.: WO02/070359

PCT Pub. Date: Sep. 12, 2002

(65) Prior Publication Data

US 2004/0149603 A1  Aug. 5, 2004

(51) Int. Cl.
*B65D 85/57* (2006.01)
*B65D 27/00* (2006.01)

(52) U.S. Cl. ............... 206/312; 206/308.1; 229/75

(58) Field of Classification Search ............... 206/307, 206/308.1, 312, 313; 229/67.1, 67.4, 75, 229/82, 84

See application file for complete search history.

(56) References Cited

U.S. PATENT DOCUMENTS

| | | | | |
|---|---|---|---|---|
| 90,663 | A | * | 6/1869 | Hoffacker ............... 229/84 |
| 125,664 | A | * | 4/1872 | Crowell .................. 229/82 |
| 905,923 | A | | 12/1908 | Rawdon |
| 1,042,488 | A | * | 10/1912 | Shaffer .................. 229/84 |
| 1,048,556 | A | | 12/1912 | Mackie |
| 1,225,924 | A | * | 5/1917 | Burris .................... 229/84 |
| 2,013,664 | A | | 9/1935 | Marowitz |
| 2,345,793 | A | | 4/1944 | Chapel |
| 3,759,372 | A | | 9/1973 | Venema |
| 4,923,111 | A | | 5/1990 | Down |
| 5,255,785 | A | | 10/1993 | Mackey |
| 5,333,780 | A | | 8/1994 | Scott |
| 5,348,216 | A | | 9/1994 | Scott |
| 5,638,666 | A | * | 6/1997 | Davidov ................. 53/569 |
| 6,045,035 | A | | 4/2000 | Murakami et al. |

(Continued)

FOREIGN PATENT DOCUMENTS

EP           1224129         7/2002

(Continued)

*Primary Examiner*—Mickey Yu
*Assistant Examiner*—J. Gregory Pickett
(74) *Attorney, Agent, or Firm*—Jeffer, Mangels Butler & Marmaro LLP

(57) ABSTRACT

A printable sheet (10) includes a blank (12) for an envelope having a central body panel (14), a top flap, a pair of opposing side panels, and a bottom flap (18). The envelope blank is capable of being removed from the printable sheet and folded along weakened lines to form a secure sleeve for holding various items. The sheet on which the envelope blank is formed is capable of being placed in a printer to have images and/or indicia printed thereon. The envelope may also include integral index tabs for indentifying and archiving the contents of the folded envelope. The top flap, bottom flap, and opposing side panels are adapted to interconnect to secure items in the envelope.

24 Claims, 4 Drawing Sheets

U.S. PATENT DOCUMENTS

| | | |
|---|---|---|
| 6,220,504 B1 | 4/2001 | Flynn |
| 6,220,505 B1 | 4/2001 | Flynn |
| 6,279,817 B1 | 8/2001 | Flynn |
| 6,352,198 B1 | 3/2002 | Flynn |
| 6,357,651 B1 | 3/2002 | Flynn |
| 6,364,198 B1 | 4/2002 | Flynn |
| 6,367,689 B1 * | 4/2002 | Flynn et al. ............ 206/308.1 |
| 6,375,065 B1 | 4/2002 | Flynn |
| 6,415,976 B1 | 7/2002 | Flynn |
| 6,425,519 B1 | 7/2002 | Flynn |
| 6,427,905 B1 | 8/2002 | Flynn |
| 6,488,999 B1 | 12/2002 | Flynn |
| 6,499,652 B1 | 12/2002 | Flynn |
| 6,523,737 B1 | 2/2003 | Flynn |
| 2002/0070266 A1 * | 6/2002 | Glenn et al. ............ 206/308.1 |

FOREIGN PATENT DOCUMENTS

| | | |
|---|---|---|
| EP | 1277190 | 1/2003 |
| WO | WO 2001025100 | 4/2001 |
| WO | WO 2001079068 | 10/2001 |

* cited by examiner

PRINTABLE SLEEVE ENVELOPE AND METHOD OF FORMING SAME

BACKGROUND OF THE INVENTION

1. Field of the Invention

The present invention provides an envelope capable of securely packaging various items. Specifically, the present invention provides a foldable envelope formed on a printable sheet that is capable of receiving items such as compact discs and computer diskettes for storage, organization and transportation.

2. General Background and State of the Art

The prior art includes numerous envelopes that are capable of securely packaging various items. Recordable compact discs, which are packaged in bulk, are sold without accompanying jewel cases. Foldable envelopes therefore present a solution to the need to protect such items. One such envelope is disclosed in U.S. Pat. No. 5,938,022, which provides an envelope having a pair of side flaps, a top flap and a bottom flap. The pair of side flaps fold inward relative to a central portion, but do not connect together. The top flap and bottom flap also fold inward relative to the central portion and connect together to provide a secure envelope within the side flaps.

Another prior art envelope is disclosed in U.S. Pat. No. 6,045,035. This patent discloses an envelope having a pair of side flaps that connect with a bottom flap. The bottom flap also connects to a top flap, providing an envelope that is secured by more than one connection between parts.

Another prior art reference, disclosed in U.S. Pat. No. 5,101,973, provides flaps that connect together to securely hold items. The flaps of this envelope are connected together using adhesives. Yet another envelope is disclosed in U.S. Pat. No. 5,348,216. This patent provides an envelope that includes flaps that fold to secure an item.

Yet another prior reference, disclosed in an international application published under the PCT and having publication number WO 99/43577, provides a pouch formed on a printable and shapeable sheet. This pouch has a semi-circular circular tabs, or cutouts, disposed on one portion of the pouch. Side panels slide into the cutouts to form a closed end. The pouch remains open at the top.

INVENTION SUMMARY

There is therefore a need for protecting and identifying items such as recordable compact discs after they have been recorded. In the case of compact discs, jewel cases are commonly used for this purpose. However, an alternate method for protecting and identifying items is to use a sleeve made of paper or a paper based card stock. It is often desirable to add printed indicia to the sleeves, and the present invention is a system and method for accomplishing this purpose.

Accordingly, it is an object of the present invention to provide an envelope that is capable of folding to securely package various items therein. It is also an objective of the present invention to provide a sheet on which the envelope is formed, with the envelope capable of being separated from the sheet after the sheet has passed through a printer or copier and custom indicia printed on the envelope portion thereof. It is a further object of the invention to provide a sheet having an envelope that is capable of having images and/or indicia printed thereon. It is yet another object of the present invention to provide an envelope that has at least one index tab, for the purpose of identifying and archiving the folded envelope.

The present invention provides a printable, foldable envelope that is capable of folding to securely package various items. The present invention includes a sheet on which an envelope is formed having weakened lines separating the outline of the envelope from the sheet. The envelope is separable from the sheet and capable of being folded along additional weakened lines to form secure packaging for various items. The sheet is capable of being placed in a printer and having images and/or indicia printed thereon, enabling the envelope to have words or pictures custom designed and printed on it by the user using his personal computer and printer to describe the envelope's contents.

The present invention also discloses a card stock construction that can be printed in an inkjet or laser printer and formed into a compact disc sleeve, and a method for utilization of same. The card stock comprises the sheet having the envelope formed thereon. The sheet is perforated in such a way as to allow the sheet to maintain integrity during the manufacturing and printing processes, while allowing the unfolded printable sleeve to be separated from the sheet without the use of tools. The sheet also has creases, scores, or perforations to create weakening lines at the locations where folding is to take place.

The envelope includes a top flap, a bottom flap, and a pair of opposing side flaps. These flaps are capable of interconnecting with each other in some manner. Therefore, the envelope, when in a folded position, advantageously does not use adhesives to hold the flaps together. The present invention also provides that the envelope may include at least one index tab for archiving the contents of the envelope. The present invention provides that in at least one embodiment, an index tab is partially removable from the top flap and capable of being raised relative to the top flap when the envelope is in a folded and stored position.

The present invention can also be alternatively described as a printable sleeve envelope comprising a sheet having a central body panel bordered by a pair of opposing side panels, each side panel having a locking tab, a bottom flap having a pair of slots therein, and a top flap having an index tab, with the central body panel, bottom flap, opposing side panels and top flap forming the outline of an envelope on the sheet. A plurality of folding lines separates the central body panel from the opposing side panels, the bottom flap and the top flap, with the opposing side panels, bottom flap and top adapted to fold along said folding lines. The slots in the bottom flap are adapted to receive the locking tabs to secure said opposing side panels and said bottom flap in a first position, and said top flap is adapted to fold such that said index tab is behind said bottom flap and between said bottom flap and said central body panel in a second position when said bottom flap is also folded relative to said folding lines.

The present invention therefore provides numerous advantages over the existing prior art. The locking tabs of the present invention insert into slots on one interfitting portion to provide a strong, secure envelope that can remain closed when handling the envelope or when forming other sections of the envelope from the sheet. Other envelopes open at the slightest application of force and do not provide any method of interlocking the panels, leaving the envelope flimsy and unreliable. Also, some prior art envelopes do not close at all edges. The present invention includes a top flap that folds over and tucks between the bottom flap and the central body panel. This top flap arrangement, coupled with the insertable locking tabs, provides a secure envelope on all sides and allows the envelope to be tilted in any direction and still retain its contents. Other features not present in the prior art include a single self-adhesive closure label that additionally allows the envelope to be used as a mailer, and tabs that may be included for indexing purposes.

DETAILED DESCRIPTION OF PREFERRED EMBODIMENTS

Figure 1:
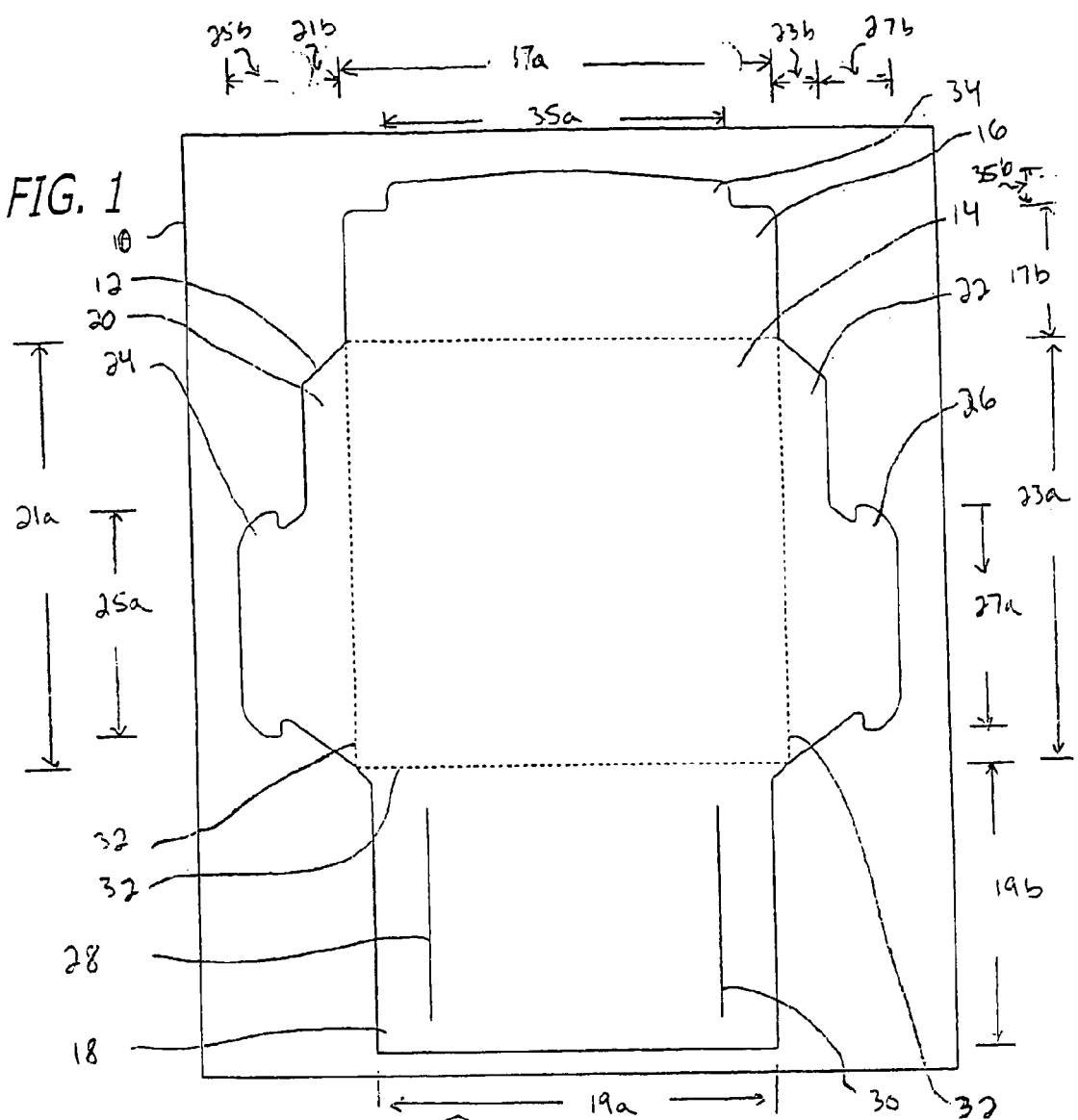
FIG. 1 is a top plan view of a printable sheet of the present invention having an envelope formed thereon.

FIG. 1 shows a printable sheet 10 having an envelope 12 formed thereon. The envelope 12 is formed as a sheet or portion on the printable sheet 10. The envelope perimeter is preferably formed by a combination of cuts and microperforations. The cuts would be around complicated shapes, such as the tuck tabs on the side flaps, with intermittent ties to maintain the integrity of the sheet. Most of the perimeter would be microperforations that might, for example, have a 0.025" cut and a 0.007" tie. The cut and tie could be larger or smaller but would typically have dimensional ratio between 2:1 and 5:1 (the larger number being the cut dimension, and the smaller number being the tie dimension). The envelope fold lines discussed below are formed by crease in the sheet 10. This is accomplished by scoring the sheet using a slightly rounded die blade and pressing part way into the sheet to create the score. The envelope 12 includes a central body panel 14. The central body panel 14 is a substantially square portion that is surrounded by a plurality of interfitting portions. These interfitting portions include a top flap 16, a bottom flap 18 and a pair of opposing sides flaps 20 and 22. The opposing side flaps 20 and 22 each have a locking tab 24 and 26 disposed thereon. Slots 28 and 30 in the bottom flap 18 are capable of receiving the locking tabs 24 and 26, respectively, when the bottom flap 18 is folded relative to the central body panel 14. Separating the central body panel 14 from the top flap 16, bottom flap 18, and opposing side flaps 20 and 22, are a plurality of weakened lines 32 which allow the various flaps to fold relative to the central body panel 14. The top flap 16 also includes a folding tab 34.

In a preferred embodiment, the dimensions of the interfitting portions are as follows. The top flap 16 is approximately 5" long as indicated in FIG. 1 by reference numeral 17a, and is approximately 1½" wide without the folding tab 34, as indicated by reference number 17b. The bottom flap 18 is approximately 5" long as indicated by number 19a in FIG. 1, and is about 3" to 3⅜" wide as shown in FIG. 1. by number 19b. Each side panel 20 and 22 is approximately 5" long as shown by numbers 21a and 23a, respectively, and approximately ½" wide without the locking tabs 24 and 26, as shown by numbers 21b and 23b. The locking tabs 24 and 26 are each approximately 2⅝" long as shown by numbers 25a and 27a, and are approximately ¾" wide as shown by 25b and 27b. The folding tab 34 is approximately 4" long as shown by number 35a, and is approximately ⅜" wide as shown by number 35b. The central body panel is about 4¾" to 5" long on each side, as shown by 15a. The above-itemized dimensions are approximate preferred dimensions only.

The printable sheet 10 of the present invention may be made of any material capable of securely holding items placed within the printable sheet 10. The printable sheet 10 can therefore be made of paper, cardboard, cardstock, or any other material sturdy enough to provide a secure package. Where the printable sheet is made of cardstock, the cardstock may be of such a caliper and weight as to be compatible with laser and inkjet printers. The card stock would typically be between 80#/ream and 120#/ream, ranging in caliper from 0.007" to 0.010". The size of the printable sheet 10 may be any size that is capable of fitting within a printer and that is also capable of providing a large enough secure envelope to securely hold items placed therein. For example, the printable sheet 10 may have the size of 8½" regular paper. In another embodiment the printable sheet 10 may be A4 paper. Additionally, sheets that are pre-printed, sheets that have a film or foil overlaminate, and sheets that have a topcoating are all within the scope of the present invention.

Figure 2:
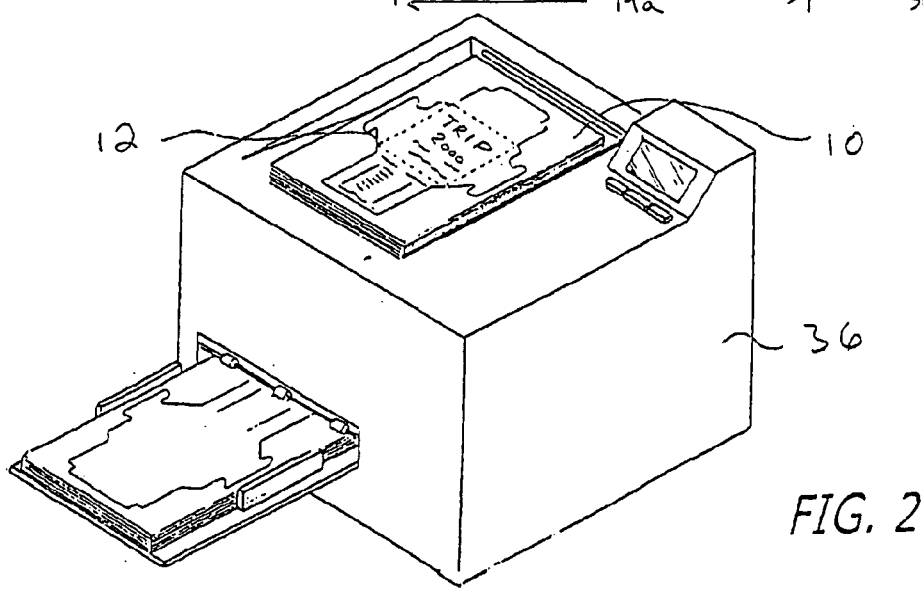
FIG. 2 is a perspective view of a printer (or copier) having the printable sheet of FIG. 1 being fed in a printer and the desired indicia printed thereon.

FIG. 2 shows a printer or copier 36 having a stack of the printable sheets 10 of the present invention in the input tray thereof. The printable sheet 10 is capable of having an image or images and indicia 37 printed thereon by the printer 36. The indicia can be custom designed by the user on his/her personal computer. The images or indicia 37 may be words, pictures or a combination of both. The images or indicia 37 may be printed on the entire face of the envelope, and may differ completely from any printing that may exist on items to be placed in the envelope. In one embodiment, the printer 36 prints the desired images and/or indicia 37 on all surfaces of the envelope through a single pass through the printer 36. The printer 36 may be any type of commercial printer commonly used for printing images or indicia on paper. For example, the printer 36 may be an inkjet printer, a laser printer, or any other type of machine capable of both large-scale and small-scale printing capacity.

Figure 3:
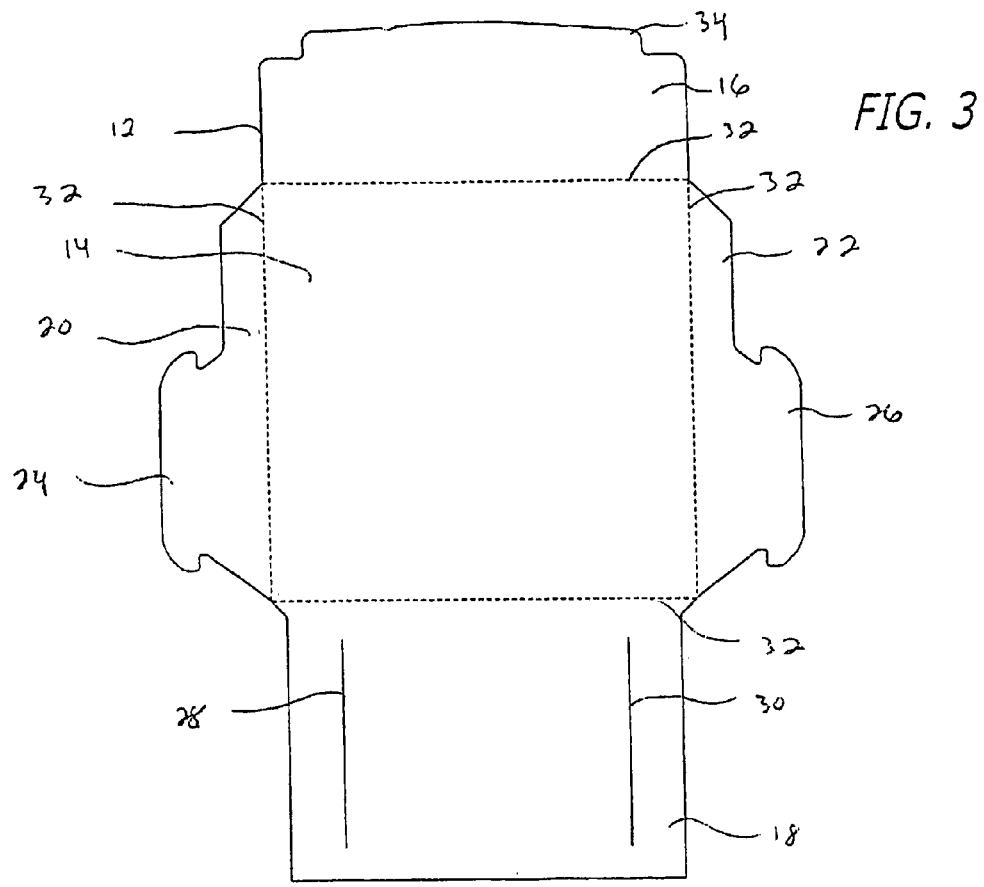
FIG. 3 is a bottom plan view of the envelope removed from the printable sheet.
Figure 4:
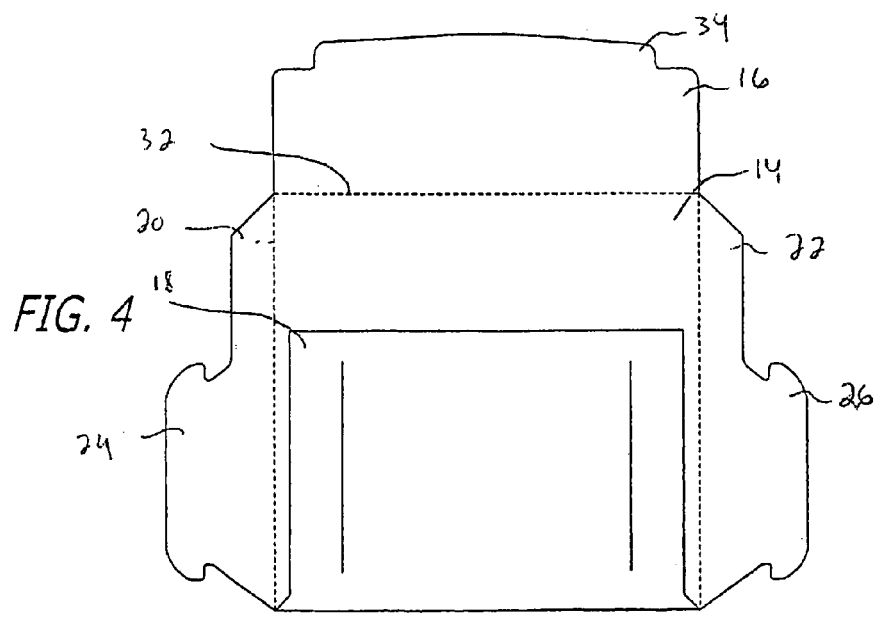
FIG. 4 is the envelope of FIG. 3 with a bottom flap folded upward toward a central body panel thereof.

FIG. 3 shows the envelope 12 of the present invention removed from the printable sheet 10, preferably after having passed through the printer 36 and the images and/or indicia 37 printed thereon. The envelope 12 shown in FIG. 3 is in a substantially flat position with the top flap 16, opposing side flaps 20 and 22 and bottom flap 18 in position such that they are not folded relative to the weakened lines 32 separating them from the central body panel 14. FIG. 4 shows the envelope 12 having the bottom flap 18 folded along one of the weakened lines 32 such that the bottom flap 18 and central body panel 14 are laying in substantially parallel positions relative to each other. In FIG. 4, the opposing side flaps 20 and 22 and top flap 16 are not folded relative to the weakened lines 32 separating them from the central body panel 14.

Figure 5:
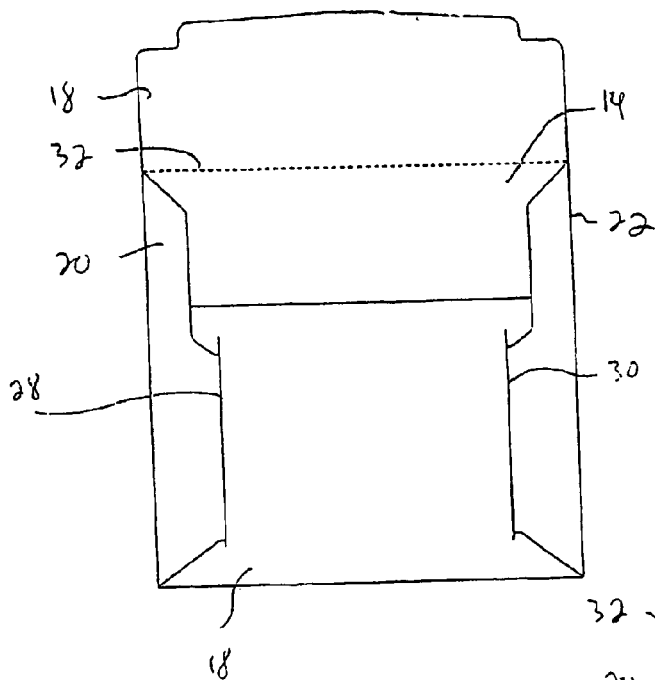
FIG. 5 shows the envelope with opposing side panels folded toward each other and received in the bottom flap.
Figure 6:
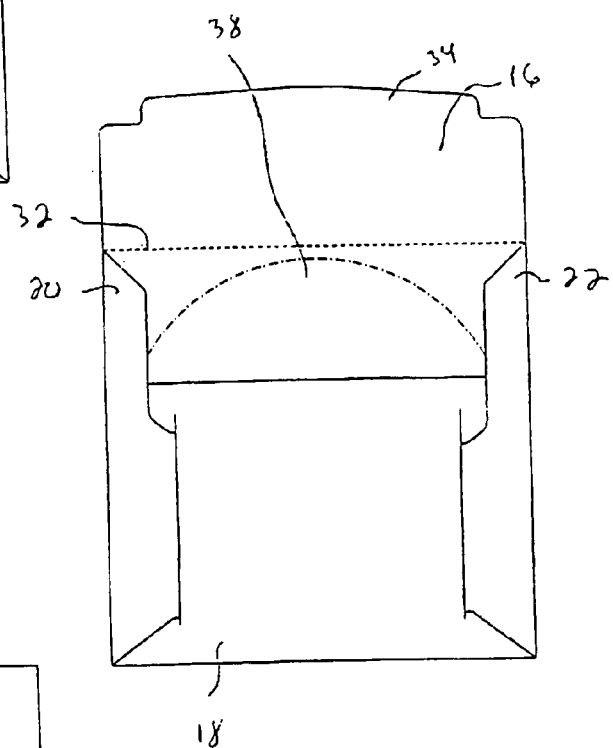
FIG. 6 shows the envelope with the opposing side panels and bottom flap folded in a first position and a disc placed in the pocket formed between the bottom flap and the central body panel.

FIG. 5 shows the envelope 12 of the present invention having the opposing side flaps 20 and 22 folded along the weakened lines 32 separating them from the central body panel 14. The locking tabs 24 and 26 disposed on the opposing side flaps 20 and 22 are shown in FIG. 5 inserted into the slots 28 and 30 of the bottom flap 18. This configuration provides a first position in which the top flap 16 is left open and the opposing side flaps 20 and 22 and bottom flap 18 form a pocket within which an item may be placed. FIG. 6 shows the envelope 12 of the present invention in the first position as shown in FIG. 5 with a compact disc 38 placed between the central body panel 14 and the bottom flap 18. The compact disc 38 is securely positioned between the central body panel 14 and the bottom flap 18 in the pocket formed by the opposing side flaps 20 and 22 and the locking tabs 24 and 26 inserted into the slots 28 and 30 of the bottom flap 18.

In one embodiment of the present invention, sections of the sheet are coated with a pressure sensitive adhesive. The sheet may also be partially or completely overlaminated with a release liner. In this embodiment, prior to the folding of the flaps along the weakened lines 32, the release liner is removed and the resulting selective areas of exposed pressure sensitive adhesive hold the envelope together after folding. This method of holding the flaps of the envelope together may be used in addition to the locking tabs, slots and folding tab. In an alternate, less preferred embodiment, this method may be used instead of the locking tabs, slots and folding tab.

Figure 7:
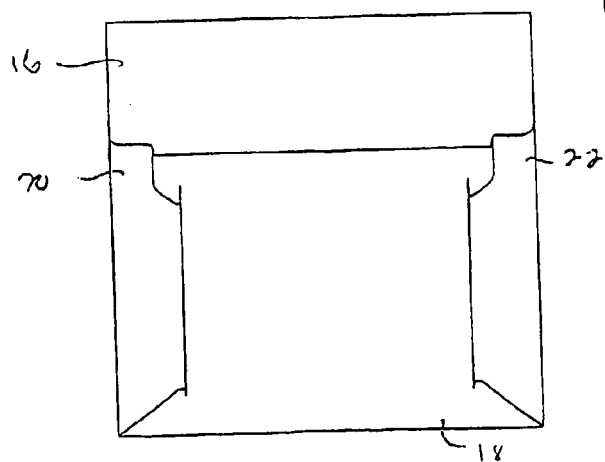
FIG. 7 shows the envelope in the first position with the top flap folded down in a tucked position such that a folding tab on the top flap is positioned between the bottom flap and the central body panel.

FIG. 7 shows the envelope 12 of the present invention with the top flap 16 folded down relative to the weakened line 32 separating it from the central body panel 14. In FIG. 7, the folding tab 34 on the top flap 16 is positioned such that it inserts between the bottom flap 18 and the central body panel 14. The folding down of the top flap 16 and the insertion of the folding tab 34 completes the closure of the envelope 12 thereby providing a secure package for items placed inside the envelope, such as, for example, the compact disc 38 of FIG. 6. The envelope of FIG. 7 represents a second position in which all flaps bordering the central body panel 14 have been folded to provide the closed envelope as shown in FIG. 7.

Figure 8:
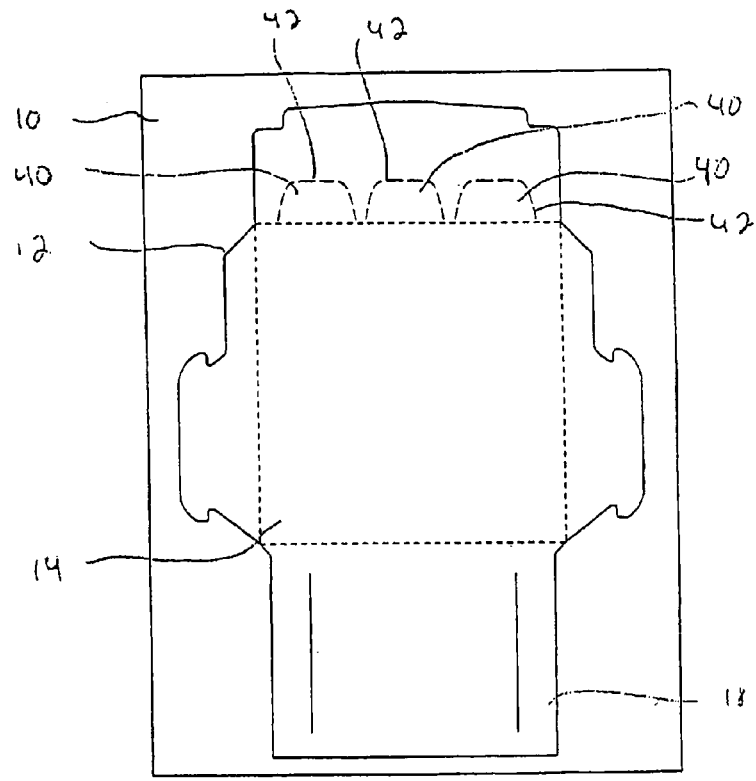
FIG. 8 shows another printable sheet of the present invention with the envelope formed thereon, the envelope including three index tabs capable of being punched out from the top flap of the envelope.

FIG. 8 shows a second embodiment in which the printable sheet 10 and the envelope 12 have a plurality of index tabs 40 disposed on the printable sheet 10. The plurality of index tabs 40 are situated on the top flap 16 and are adapted to be at least partially removable from the top flap by punching them out along fold lines 42. The index tabs 40 can be completely removed from the sheet 10 if they are not needed.

Figure 9:
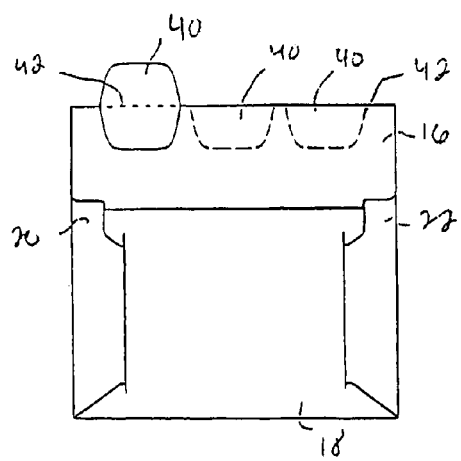
FIG. 9 shows the envelope separated from the sheet of FIG. 8 in a second position with one of the index tabs punched out and raised relative to the top flap.
Figure 10:
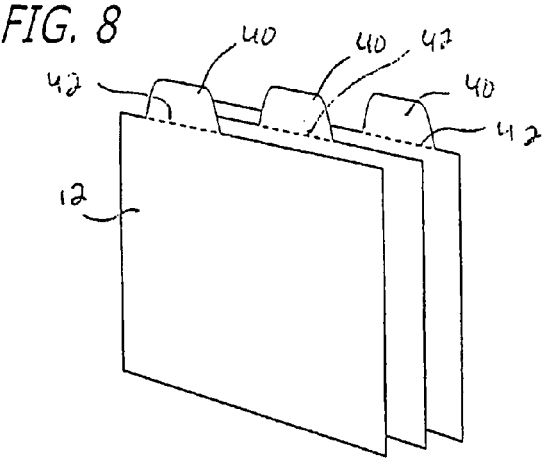
FIG. 10 is a perspective view of a series of folded envelopes of the invention, such as those shown in FIG. 9, each having a different index tab raised relative to the top flap.

FIG. 9 shows the envelope in the second position as also shown in FIG. 7. In FIG. 9, the index tabs 40 are shown with one of the index tabs 40 raised relative to the top flap 16. FIG. 9 shows three index tabs 40. The first index tab is raised relative to the top flap 16 and is also shown in a lowered position to indicate that it is capable of moving relative to the top flap 16. The other index tabs 40 are folded down relative to the top flap 16. In FIG. 9, the index tabs 40 that are folded down may be either partially removed from the envelope and folded down or may be still fully part of the envelope without ever having been removed. Therefore, index tabs 40 placed at different positions on the top flap 16 can be used to easily categorize or archive multiple envelopes. FIG. 10 shows a series of envelopes 12, each having a different index tab 40 raised to the top flap 16 to catalog or archive a series of envelopes.

In one embodiment of the invention, a seal may be placed on the envelope 12 over the place where the folding tab 34 inserts between the bottom flap 18 and the central body panel 14. The application of the seal, which may be a paper or film label using an adhesive to removably attach to the envelope 12, allows the envelope 12 to be used as a mailable parcel. The seal prevents the folding tab 34 from becoming separated and allows for a more secure package. Mailing information, such as addresses and postage, can be printed on the envelope 12 by hand or by the printer 36.

Another invention disclosed herein is a set of "envelopes" (see FIG. 10) (preferably user printed and folded) wherein the top flaps have a plurality of "punch-out" index tabs 40 on lines 42. Thereby the user can punch out (and fold up) different tabs in different envelopes such that the tabs are staggered, as depicted in FIG. 10.

It is to be understood that other embodiments may be utilized and structural and functional changes may be made without departing from the scope of the present invention. The foregoing description of the embodiments of the invention have been presented for the purposes of illustration and description. It is not intended to be exhaustive or to limit the invention to the precise form disclosed. Accordingly, many modifications and variations are possible in light of the above teaching. For example, each of the opposing side panels may have multiple locking tabs disposed thereon for insertion into slots on the bottom flap. In another example, each opposing side flap may have one locking tab and one slot disposed in a reciprocal relationship relative to the opposite side flap, such that each slot receives a locking tab on the opposite side flap. It is therefore intended that the scope of the invention be limited not by this detailed description, but rather by the claims appended hereto.

I claim:

1. A sheet construction comprising:
   a printable sheet having weakened separation lines forming at least a substantial portion of a perimeter of a separable envelope assembly;
   the separable envelope assembly including: (a) a central body portion; (b) a first side panel along a first side edge of the central body portion and separated therefrom by a first weakened fold line on the printable sheet, the first side panel including a first locking tab; (c) a second side panel along an opposing second side edge of the central body portion and separated therefrom by a second weakened fold line on the printable sheet, the second side panel including a second locking tab; (d) a bottom flap along a bottom edge of the central body portion and separated therefrom by a third weakened fold line on the printable sheet, the bottom flap including a first locking tab slot and a second locking tab slot; and (e) a top flap along a top edge of the central body portion and separated therefrom by a fourth weakened fold line on the printable sheet, the top flap including a folding tab;
   the weakened separation lines allowing the separable envelope assembly to be separated by a user from the rest of the printable sheet after the printable sheet has been passed through a printer or copier and desired indicia printed on the separable envelope assembly to form a separate envelope assembly; and the separate envelope assembly being configured and adapted such that: (1) the bottom flap can be folded up on the third weakened fold line towards the central body portion and to a folded-up position; (2) with the bottom flap in the folded-up position, the first and second side panels can be folded on the first and second weakened fold lines, respectively, towards the bottom flap and the first and second locking tabs can be inserted into the first and second slots, respectively, such that the central body portion, the bottom flap and the first and second side panels together define a pocket having an open top; and (3) the top flap can be folded on the fourth weakened fold line and the folding tab tucked into the pocket behind a top edge of the bottom flap into a pocket-closed position to thereby close the top of the open pocket and secure an article positioned therein and to allow the top flap to be later moved to an open position to allow the article to be removed from the pocket.

2. The sheet construction of claim 1 wherein the first and second locking tabs both have mushroom shapes.

3. The sheet construction of claim 1 wherein the weakened separation lines define the entire perimeter of the separable envelope assembly, and the entire perimeter is spaced inwardly from all of the edges of the printable sheet.

4. The sheet construction of claim 1 wherein the length of the first locking tab slot is less than the width of the portion of the first locking tab that is inserted into said slot.

5. The sheet construction of claim 1 wherein the length of the first locking tab slot is less than the length of the longest portion of the first locking tab.

6. The sheet construction of claim 5 wherein the length of the longest portion of the first locking tab slot is approximately 2⅝ inches.

7. The sheet construction of claim 1 wherein the envelope assembly includes a weakened tab separation line in the top flap, having opposite ends at spaced location on the fourth fold line and defining an index tab when punched out and with the top flap in the pocked-closed position, the index tab extending out from the central body portion.

8. The sheet construction of claim 7 wherein the index tab defines a first index tab and the weakened tab separation line defines a first weakened tab separation line, and wherein the envelope assembly includes a second weakened tab separation line in the top flap, having opposite ends at spaced location on the fourth fold line and defining a second index tab when punched out and with the top flap in the pocked-closed position, the second index tab extending out from the central body portion, and the first and second index tabs are both spaced inwardly from both ends of the top flap forming non-index tab portions of the top flap at both ends thereof.

9. The sheet construction of claim 1 wherein the first locking tab is offset from a center of a body of the first side panel and positioned closer to the third fold line than to the fourth fold line, and the second locking tab is offset from a center of a body of the second side panel and positioned closer to the third fold line than to the fourth fold line.

10. The sheet construction of claim 1 wherein the folding tab includes a folding tab body portion and a tab portion, the tab portion extending outwardly from the folding tab body portion, the folding tab body portion being along the fourth weakened fold line, and the tab portion being centered on the folding tab body portion and spaced inwardly from ends of the folding tab body portion.

11. The sheet construction of claim 1 wherein the separate envelope assembly is configured such that with the bottom flap in the folded-up position and flat against the central body portion a top edge of the bottom flap is spaced a distance from the fourth weakened fold line.

12. The sheet construction of claim 11 wherein the distance is approximately between 1⅝ and 2 inches.

13. The sheet construction of claim 1 wherein the separate envelope assembly is configured such that when the top flap is in the pocket-closed position the top flap covers top portions of the first and second side panels.

14. The sheet construction of claim 1 wherein the top flap has a body portion adjacent the fourth weakened fold line and the folding tab is inset a distance at both ends thereof from ends of the body portion.

15. The sheet construction of claim 1 wherein the weakened separation lines comprise a combination of cuts and microperforations, and all of the fold lines comprise scored lines.

16. The sheet construction of claim 1 wherein the length of the bottom flap in a direction perpendicular to the third weakened line is greater than the length of the top flap in the direction perpendicular to the third weakened line.

17. The sheet construction of claim 16 wherein the length of the bottom flap in the perpendicular direction is approximately between 3 and 3⅜ inches, and the printable sheet has 8½ by 11 or A4 dimensions.

18. The sheet construction of claim 1 wherein the first, second, third and fourth weakened fold lines define a rectangle.

19. The sheet construction of claim 1 wherein the article is a flat disk.

20. The sheet construction of claim 1 wherein the central body portion is approximately 4⅜ inches to 5 inches long on each side, and the article is a compact disc.

21. The sheet construction of claim 1 wherein the printable sheet is a single layer of card stock.

22. The sheet construction of claim 1 wherein the printable sheet is rectangular.

23. The sheet construction of claim 1 wherein the printable sheet is 8½ by 11 inches.

24. The sheet construction of claim 1 wherein the printable sheet has A4 dimensions.

* * * * *